June 2, 1953  R. DE MELLO  2,640,517

APPARATUS FOR MANUFACTURE OF CORRUGATED PLYWOOD

Filed Dec. 29, 1950

INVENTOR

Ruben De Mello

BY Wenderoth, Lind & Ponack

ATTORNEYS

Patented June 2, 1953

2,640,517

UNITED STATES PATENT OFFICE 2,640,517

APPARATUS FOR MANUFACTURE OF CORRUGATED PLYWOOD

Ruben de Mello, Sao Paulo, Brazil

Application December 29, 1950, Serial No. 203,251
In Brazil November 13, 1950

4 Claims. (Cl. 144—283)

The present invention is related to applicant's copending patent application Ser. No. 203,252, filed of even date herewith, now abandoned, said copending application directed to a novel corrugated plywood construction.

The present invention relates to apparatus for corrugating and laminating a plurality of wooden ply sheets. The apparatus of the invention shapes thin, flat wooden sheets into corrugated form and glues these sheets to each other under heat and pressure to produce a laminated corrugated sheet which provides the appearance of a series of straight parallel channels alternately concave and convex.

The apparatus of the invention comprises a plurality of mating platens, said platens having surfaces corresponding to the shape of the finished corrugated plywood. The platens of the apparatus of the invention are heated and are subjected to pressing means in order to provide the necessary heat and pressure for the corrugated shaping of the plurality of ply sheets worked upon.

Although the shaping of fibrous paper sheets, metal sheets, paper sheets impregnated with cement, and cellulosic wall board products in corrugated form is readily accomplished by the apparatus of the prior art, such apparatus is not suitable for the production of corrugated plywood. The wood plies glued together under heat and pressure in order to obtain plywood of the thickness necessary for commercial application, when subjected to processing by molds suitable for the corrugation of paper, readily cracks and causes the apparatus to become overloaded because of the resistence of the wooden plies to shaping.

Although it would be comparatively easy to make corrugated plywood in common molds with a maximum of 3 or 4 corrugations, this method could not be applied for a large number of corrugations, as the sheets would not adapt themselves to the mold before being exposed to the pressure, upon which they would crack and become worthless.

An object of the invention is a novel apparatus for fabricating corrugated laminated plywood which applies the corrugated molding elements to the wood plies being laminated so as to engage said plies at the center of the sheet being molded in said curved form, at a higher pressure than at the peripheral portions of the plies being molded, to thereby compensate for the imperfect tolerances in the curved ply sections relative to the molding surface and to obtain a final product of substantially uniform wood thickness throughout the sheet material.

A further object of the present invention is an apparatus for the manufacture of this material on an industrial scale, with any number of corrugations or indentations per finished plywood sheet.

The apparatus causes the wood plies to adapt themselves, in the first light pressing stage, quite accurately to the desired molding curvature, and thereafter applies to them the necessary pressure for glueing.

The present invention, which includes also the apparatus necessary for the execution of the new process, shall be now described with reference to the attached drawings, in which Figure 1 is a cross section of the corrugated plates with the devices of the present invention in three positions: before starting to corrugate the material; with the first central indention being adapted to the mold; and with all indentations adapted to the mold.

In the spaces between the plates, the veneer sheets $e1$, $e2$, $e3$ are inserted which after application of pressure will form the corrugated plywood. In the first stage, the sheets $e1$ will touch all nodal portions $c$ and the bar of the central part $f$ of the lower plate, as this bar $f$ is higher than the adjacent bars $g$, and these in their turn are higher than $h$. The bars $f$, $g$, $h$ are separated from their bases by means of spiral springs $i$ located in holes in the plates. The central spiral spring $i1$ which lifts bar $f$ is freater than $i2$, which in its turn is greater than $i3$, and thus successively so that central bars remain at a higher level than the lateral bars.

The veneer sheets $e$ are placed so that the grain thereof lies in directions perpendicular one to the other and are coated with a suitable glue according to the normal procedure for the manufacture of plane plywood.

As shown in sheet $e2$, the veneer sheet is in a position for perfect adaptation of the central corrugation by means of bar $f$, whereas in the adjacent corrugation $g$ the adaptation is less pronounced, and still less in the next corrugation $h$, so that it is clear that the process of corrugation proceeds progressively and successively from the center along the edges, which in this manner remain always free and therefore allow the material to slip, thus avoiding any cracks before the material has adapted itself perfectly to the mold.

When the press is actuated, the springs $i$ are compressed until they reach the position of complete corrugation $e3$, in which the springs disappear entirely in their respective cavities and the bars $f, g, h$ touch their bases, and thus are able to transmit the pressure to the sheets $e$ as if the plates were one solid piece.

Figure 1:
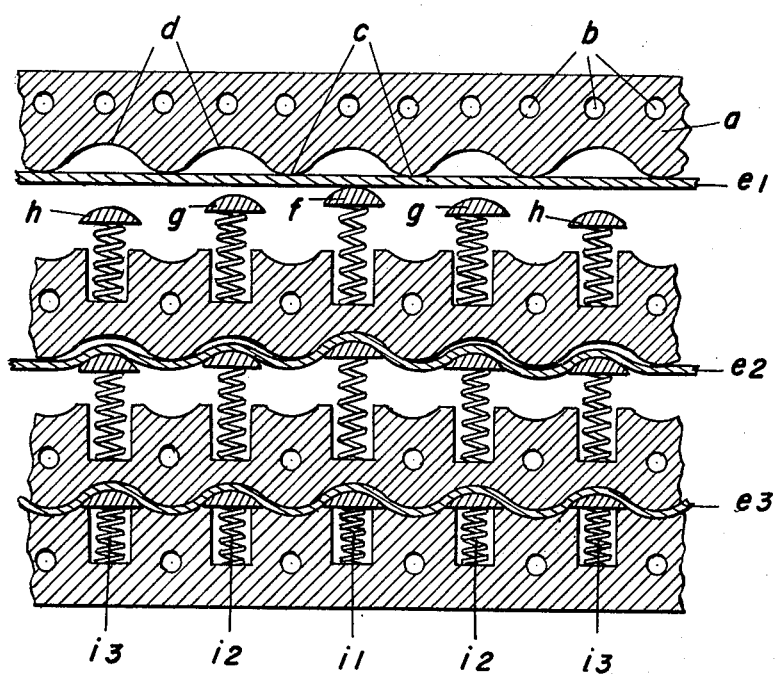
Figure 1 shows the plates $a$ with the heating channels $b$ through which circulates steam. In the special case of corrugated plywood said plates have corrugations with nodal portions $c$ and recessed portions $d$.
Figure 2:
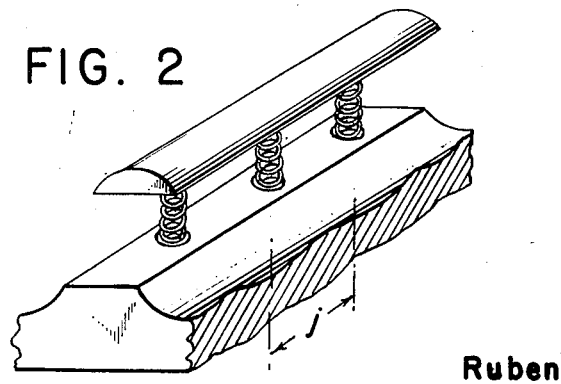
Figure 2 is a perspective view of a bar showing the device according to the invention.

Figure 2 shows a perspective view of a corrugation with the bar lifting device, where it can be seen that one spring is separated from the others by the distance $j$ which can be adjusted so as to furnish the necessary force to adapt the sheets in the corrugations.

It is evident that these lifting devices for the nodal portions of the corrugations may be applied to the lower or to the upper mold platens or to both. In practice, however, it is sufficient and quite effective to employ only the lower parts of said devices since application to the upper parts would make a special device necessary to prevent the bars from falling down.

Instead of springs as bar lifting devices, any other device may be used, as for instance pistons operated by compressed liquid or gas, elastic rubber pieces or other equivalent material. In any case, it is essential that the central detached part of the corrugation has a greater height or, more correctly, the central undulation has a greater amplitude, so that the adaptation of the sheets to the mold proceeds successively from the center to the outer corrugations, and not simultaneously over the entire area of the sheet.

Based upon the above specifications and the description of the apparatus according to the present invention for the manufacture of corrugated plywood, which is explained in the drawings and the foregoing specification.

What is claimed is:

1. An apparatus for the manufacture of corrugated plywood comprising undulated corrugating platens having heating means therein, said corrugated platens interfitting each other to shape a plurality of glue-coated wood ply sheets into corrugated form, a plurality of detachable separate nodal bars spaced on one said platen and being extensible from the main body of said platen, individual spring pressing members for each said separate nodal bar, each of said spring pressing members being capable of separately and independently pressing the nodal portion of the corresponding bar to the other of said shaping platens to provide for the adjustment of the platen pressure along the edges of the glue-coated wood ply sheets formed into corrugated shape.

2. An apparatus as claimed in claim 1 wherein the central one of said nodal bars is at a greater distance from the main body of said platen than the adjacent ones toward the edge of said platen, said nodal bars closer to the edge of said platen being progressively lower than adjacent ones towards the center of said platen whereby adaptation of the sheets to the corrugating platens in the molding of the plywood proceeds successively from the center to the outer corrugations in non-simultaneous sequence.

3. An apparatus as claimed in claim 2 wherein said individual spring pressing members comprise high strength spiral springs, the height of said springs determining the spacing of said nodal bars from said main body of said platen, the strength and height of said springs being such that the sheet being molded will be completely adapted and formed in the central corrugation before compression of the corresponding spring commences and before complete adaptation of adjacent outward forming corrugations.

4. An apparatus as claimed in claim 1, the body of said platen having said spaced nodal bars having openings in a surface thereof, said spring pressing members extending into said openings, flat portions surrounding said openings and curved portions between said flat portions, said nodal bars having oppositely curved operating surfaces thereon with respect to the curved portions on said platen, said bars in fully depressed platen contacting position covering said flat portions and said curved portions and said curved operating surfaces coacting to form a smoothly contoured corrugating surface adapted for coaction through a sheet being molded with a mating platen.

RUBEN DE MELLO.

References Cited in the file of this patent

UNITED STATES PATENTS

| Number | Name | Date |
|---|---|---|
| 1,488,504 | Keyes | Apr. 1, 1924 |

FOREIGN PATENTS

| Number | Country | Date |
|---|---|---|
| 454,229 | Great Britain | Sept. 25, 1936 |
| 344,130 | Italy | Oct. 24, 1936 |